US009380617B2

(12) United States Patent
Liu

(10) Patent No.: US 9,380,617 B2
(45) Date of Patent: Jun. 28, 2016

(54) METHOD AND DEVICE FOR INCREASING GATEWAY STABILITY IN LTE MODE FEMTO CELL SYSTEM

(71) Applicant: ZTE CORPORATION, Shenzhen, Guangdong Province (CN)

(72) Inventor: Jun Liu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/431,446

(22) PCT Filed: Sep. 25, 2013

(86) PCT No.: PCT/CN2013/084184
§ 371 (c)(1),
(2) Date: Mar. 26, 2015

(87) PCT Pub. No.: WO2014/048320
PCT Pub. Date: Apr. 3, 2014

(65) Prior Publication Data
US 2015/0257180 A1    Sep. 10, 2015

(30) Foreign Application Priority Data

Sep. 28, 2012  (CN) .......................... 2012 1 0370405

(51) Int. Cl.
*H04W 72/00* (2009.01)
*H04W 76/02* (2009.01)
(Continued)

(52) U.S. Cl.
CPC ......... *H04W 76/021* (2013.01); *H04L 41/0803* (2013.01); *H04W 76/02* (2013.01); *H04W 88/16* (2013.01); *H04W 92/14* (2013.01)

(58) Field of Classification Search
CPC .......................... H04W 76/02; H04W 56/0015
USPC ..................................................... 455/452.1
See application file for complete search history.

(56) References Cited

U.S. PATENT DOCUMENTS 9,137,767 B1*  9/2015 Guthrie ............ H04W 56/0015
2015/0257180 A1*  9/2015 Liu ....................... H04W 76/02
455/452.1

FOREIGN PATENT DOCUMENTS

CN    2010047647 A1    4/2010
CN    101808397 A    8/2010
(Continued)

OTHER PUBLICATIONS

International Search Report for PCT/CN2013/084184.
(Continued)

*Primary Examiner* — William D Cumming
(74) *Attorney, Agent, or Firm* — McClure, Qualey & Rodack, LLP

(57) ABSTRACT

A method for increasing gateway stability in a long term evolution system (LTE) mode Femtocell system comprises: a gateway (HeNB GW) determining that multiple SCTP links need to be established between the HeNB GW and a single mobility management entity (MME), and setting different Global eNB identifiers (Global eNB IDs) for S1 interfaces on different SCTP links of same one MME; the HeNB GW establishing multiple SCTP links between the HeNB GW and the MME; and for each established SCTP link, the HeNB GW notifying upper-layer application configuration information born by the SCTP link to the MME through an S1 setup request, and establishing an S1 link on the SCTP link.

18 Claims, 4 Drawing Sheets

(51) Int. Cl.
  *H04L 12/24* (2006.01)
  *H04W 88/16* (2009.01)
  *H04W 92/14* (2009.01)

(56) References Cited

FOREIGN PATENT DOCUMENTS

| CN | 102056137 A | 5/2011 |
| CN | 102223705 A | 10/2011 |
| EP | 28902061 A1 * | 7/2015 |

OTHER PUBLICATIONS

3rd Generation Partnership Project, Technical Specification Group Radio Access Network; Evolved Universal Terrestrial Radio Access (E-UTRA) and Evolved Universal Terrestrial Radio Access Network (E-UTRAN); Overall description, Stage 2 (Release 11); 3GPP TS 36.300 V11.3.0 (Sep. 2012), pp. 1-205.

EP Search Report dated Dec. 7, 2012 in corresponding EP Application No. 13841495.8-1505/2890206 PCT/CN2013084184.

"Investigating head-of-line blocking issue among four relay alternatives"; Institute for Information Industry (III), Coiler Corporation; 3GPP TSG-RAN WG3 #66; Nov. 9-13, 2009; Jeju, Korea; pp. 1-10.

3rd Generation Partnership Project; Technical Specification Group Radio Access Network; Evolved Universal Terrestrial Radio Access (E-UTRA); Relay architectures for E-UTRA (L TE-Advanced) (Release 9); 3GPP TR 36.806 V9.0.0 (Mar. 2010); pp. 1-34.

3rd Generation Partnership Project; Technical Specification Group Radio Access Network; Home (e)NodeB; Network aspects (Release 8); 3GPP TR R3.020 V0.9 1 (Nov. 2008); pp. 1-68.

* cited by examiner

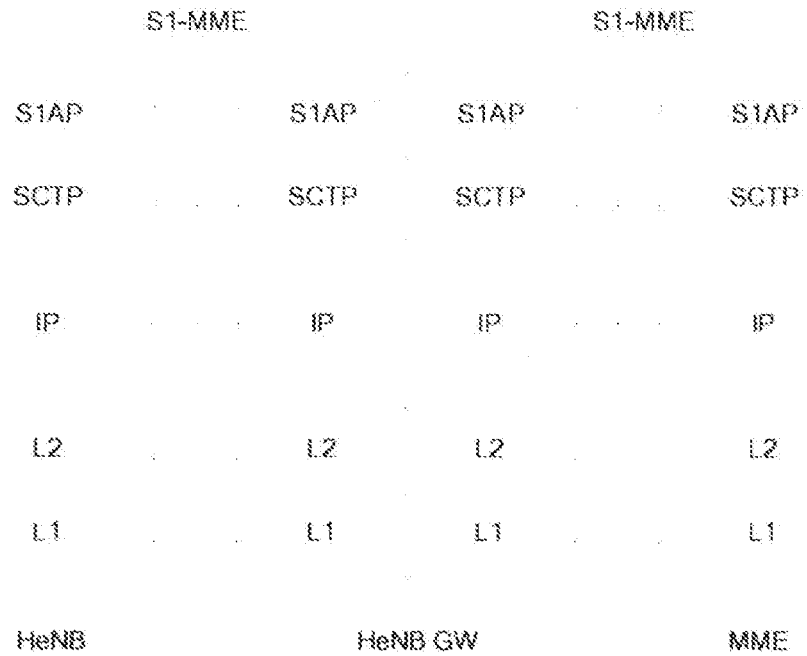

FIG. 3
(Prior Art)

The gateway HeNB GW determines that multiple SCTP links are required to be established between the HeNB GW and a single mobility management entity (MME), and sets different Global eNB IDs for the S1 interfaces on different SCTP links under the same MME — S101

The HeNB GW establishes the multiple SCTP links between the HeNB GW and the MME — S102

For each established SCTP link, the HeNB GW notifies the upper-layer application configuration information borne by the SCTP link to the MME through the S1 setup request, in order to establish the S1 link on the SCTP — S103

METHOD AND DEVICE FOR INCREASING GATEWAY STABILITY IN LTE MODE FEMTO CELL SYSTEM

TECHNICAL FIELD

The present invention relates to the Femtocell technology field in the mobile communication, and in particular, to a method and apparatus for increasing gateway stability in an LTE mode Femtocell system.

BACKGROUND OF THE RELATED ART

The English abbreviation and its explanation involved in the present text are as follows.
3G: the 3rd-Generation mobile communication technology;
LTE: the Long Term Evolution system;
GSM: the Global System of Mobile Communication;
EPC: the Evolved Packet Core;
eNB, eNodeb: the Evolved Node B;
E-URTAN: the Evolved Universal Terrestrial Radio Access Network;
UE: the User Equipment (the user terminal);
MME: the Mobility Management Entity, which is a core network element related to mainly processing the signaling;
S GW: the Serving Gateway, which is a core network element related to mainly processing the service;
Femto: the Femtocell system, mainly including the Femtocell and the Femto gateway;
HNB: the Home Node B, the Femtocell using the 3G mode;
HeNB: the Home eNB, the Femtocell using the LTE mode;
HeNB GW: the Home eNB Gateway (HeNB gateway);
SCTP: the Stream Control Transmission Protocol;
TAC: the Tracking Area Code;
CSG: the Closed Subscriber Group;
PLMN: the Public Land Mobile Network;
HeMS: the Home eNB management system;
Global eNB ID, the global network eNB identifier;
AP: the Access Point.

The LTE system is the evolution of the 3rd generation mobile communication system, and the whole LTE system is made up of three parts, the eNB, the EPC and the UE. FIG. 1 shows a network structure chart of a LTE system. The eNB is an evolved base station, the EPC is responsible for the part of the core network including the MME and the S GW, and the UE is the user terminal, wherein, multiple eNBs at the E-URTAN side access the MME/S GW through the S1 interface, and every eNB is connected to another eNB through the X2 interface.

With the continuous extension of the scale of the macro network (the 3G network or the LTE network), the user quantity is increasing constantly, and the data bandwidth requirement of the user is increased constantly. Because the utilization frequency of the 3G network and the LTE network is higher, and its penetrability of the signal is poor when compared with the GSM, the indoor coverage becomes a difficult point of the network optimization, and the indoor coverage of the 3G network or the LTE network is generally realized by adopting the mode of establishing the indoor allocation system. However, under the existing condition, the indoor allocation system can generally be established only in some hotels, medium-to-high grade communities or public hotspot places. As to the general residential quarters, limited to various conditions, it is unable to establish the indoor allocation system, so the indoor 3G or LTE signal is very weak or even there is no signal at all, which causes great influence to experience the user experience.

For this reason, a Femto system, that is the Femtocell system, has already been proposed. Its adopted public broadband or operator transmission access is accessed to the security gateway and the core network of the operator through the Internet, thus providing the wireless signal coverage to the user, which can improve the user experience and is an important technology to fill the blind area and fill the hot point of the indoor coverage. About the Femto system, it is mainly made up of the Femto base station and the femto gateway, wherein, the Femto base station is divided into the Femto base station using the 3G mode and the Femto base station HeNB using the LTE mode according to the difference of its adopted wireless technologies.

FIG. 2 shows a network element structure diagram of a Femto system of the LTE mode. The HeNB GW is introduced into the LTE system, and multiple HeNBs are linked with the HeNB GW. First of all, the HeNB GW is one-to-multiple connected to multiple HeNB through the S1 link; secondly, the HeNB GW further one-to-multiple accesses multiple MME/S GWs through the S1 link to perform load sharing and disaster recovery backup. In addition, the HeNB can also access the MME/S GW through the S1 directly. In the Femto system framework of the LTE mode in FIG. 2, it can be seen from the connection relation of every network element, as to the MME, the HeNB GW is equivalent to the macro station eNodeb; as to the HeNB, the HeNB GW is equivalent to the MME, so no matter the HeNB is linked with the MME/S GW directly, or the HeNB is linked with the MME/S GW through the HeNB GW, the definition and function of the S1 interface during that time are totally consistent. Other network elements of the Femto system of the LTE mode further include the HeMS (not shown in FIG. 2), used for configuring the related parameter of the HeNB.

As to the macro network base station eNB, the current protocol stipulates that there is and can only be one SCTP link between one MME and one eNB, which has no problem for the macro network eNB because the number of the users under one macro-base station is limited and one SCTP can already meet the requirement of the upper layer service. But after introducing the HeNB GW, tens of thousands of or even hundreds of thousands HeNBs are linked under one HeNB GW, the number of the users is increased sharply; the networking requirement is far from being satisfied if still according to the protocol; it is very difficult to meet the requirement of the vast capacity of users if only one SCTP link is established between one HeNB GW and one MME, once the number of the users increases to a certain extent, a large number of signaling loss or data packet loss is inevitable, and the gateway stability is unable to be guaranteed.

CONTENT OF THE INVENTION

In order to solve the problem that the HeNB GW capacity is unable to meet the real networking requirement in the related art, the present invention provides a method and apparatus for increasing the gateway stability in a Femtocell system of the LTE mode.

On one hand, the method for increasing gateway stability in a long term evolution system (LTE) mode Femtocell system in the present invention comprises: a gateway (HeNB GW) determining that multiple stream control transmission protocol (SCTP) links need to be established between the HeNB GW and a single mobility management entity (MME), and setting different Global eNB identifiers (Global eNB IDs) for S1 interfaces on different SCTP links under one same MME;

the HeNB GW establishing multiple SCTP links between the HeNB GW and the MME; and for each established SCTP link, the HeNB GW notifying the MME of upper-layer application configuration information born by the SCTP link through an S1 setup request, and establishing an S1 link on the SCTP link.

Preferably, the HeNB GW can determine the number of the SCTP links required to be established according to an existing network planning or according to real-time or regular system statistical data; when the number of the SCTP links required to be established is determined according to the real-time or regular system statistical data, after determining the number of SCTP links required to be established currently according to the statistical data of the system at this time, the number of the SCTP links required currently is formed through deleting or adding an SCTP link between the HeNB GW and the MME established last time.

Preferably, the above-mentioned method further comprises that: a Femto base station HeNB of an LTE mode sending out an S1 setup request to the HeNB GW, after the HeNB GW receives the request, the HeNB GW selecting one SCTP link in multiple SCTP links between the MME, which meet a requirement, and the HeNB GW for the HeNB to reside, and then establishing one S1 link between the HeNB and the HeNB GW according to the S1 setup request sent out by the HeNB and upper-layer application configuration information carried therein.

Wherein, the selecting refers to select an SCTP link, of which a current flow rate is minimum or to which minimum wireless access points (AP) are connected, to reside.

On another hand, the present invention further provides an apparatus for increasing gateway stability in a long term evolution system (LTE) mode Femtocell system, comprising: a stream control transmission protocol (SCTP) link number determination and processing module, configured to: make a gateway (HeNB GW) determine that multiple SCTP links need to be established between the HeNB GW and a single mobility management entity (MME), and set different Global eNB identifiers (Global eNB IDs) for S1 interfaces on different SCTP links under one same MME; an SCTP link establishing and processing module, configured to: make the HeNB GW establish multiple SCTP links between the HeNB GW and the MME; and an S1 link establishing and processing module, configured to: make the HeNB GW, for each established SCTP link, notify the MME of upper-layer application configuration information borne by the SCTP link through an S1 setup request, and establish an S1 link on the SCTP link.

BRIEF DESCRIPTION OF DRAWINGS

FIG. 3 is a diagram of a protocol stack between an MME and an HeNB in the related art;
FIG. 4 is a flow chart of a method for increasing gateway stability of the present invention.

PREFERRED EMBODIMENTS OF THE PRESENT INVENTION

The present invention is further described in detail with reference to the accompanying drawings and embodiments hereinafter. It should be understood that, the embodiments illustrated hereinafter are only used to explain the present invention, rather than constituting a limitation to the present invention.

In the art, the stream control transmission protocol (SCTP) provides a steady and ordered data transmission service between two endpoints, the wireless network layer protocol (S1AP) is established based on the SCTP, and the S1AP is the application layer protocol of the LTE system access network and the core network interface S1-MME, to control the transmission of the signaling and the data between the access network and the core network, as shown in FIG. 3.

The present invention provides a method for increasing the stability of HeNB GW in the Femtocell system of the LTE mode, where multiple SCTP links are established between the HeNB GW and the MME, and then, for each SCTP link, the upper-layer application configuration information borne by the SCTP link is notified to the MME through an S1 setup request. Because of this, one S1 link is established on each SCTP link, to achieve the objective of enlarging the HeNB GW capacity, preventing the data from being lost, and improving the transmission stability.

As shown in FIG. 4, the above-mentioned method specifically includes the following steps.

In S101, the HeNB GW determines the number of multiple transport layer SCTP links required to be established; and the following situations need to be realized in order to enable multiple SCTP links established between one HeNB GW and a single MME: in the view of the single MME, each S1 link established later on each SCTP belongs to different eNB, so, for the SCTP link to be established, it is required to set different Global eNB IDs (according to the protocol, the Global eNB ID includes the PLMN Identity and the eNB ID information, the two determines one eNB, that is, setting different Global eNB IDs is equivalent to providing different virtual eNBs) for the S1 interfaces on different SCTP links under the same MME.

In S102, the HeNB GW establishes the required multiple SCTP links between itself and the MME.

In S103, for each SCTP link, the HeNB GW notifies the MME of the upper-layer application configuration information borne by the SCTP link through the S1 setup request, in order to establish the S1 link on the SCTP link.

Each established S1 link can be used to transmit the S1 interface message, thus being able to perform the valid load sharing to the S1 message between the HeNB and the MME, to reduce and even avoid the packet loss which may appear in a SCTP link and to improve the capacity and the stability of the HeNB GW.

Figure 1:
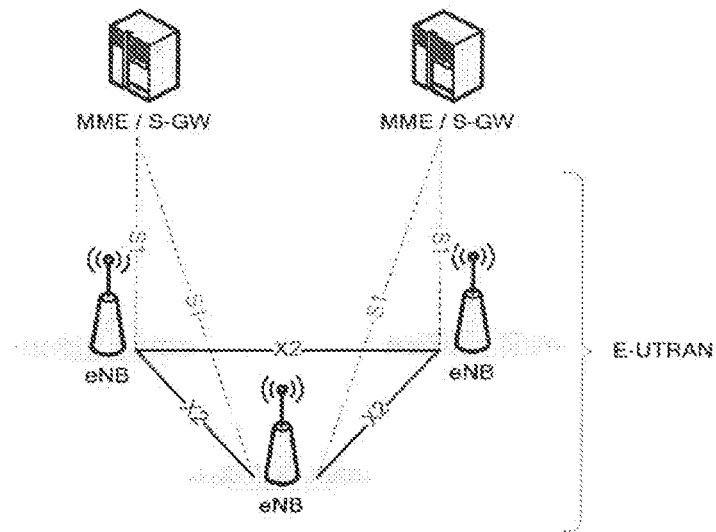
FIG. 1 is a network framework diagram of an LTE system in the related art.
Figure 2:
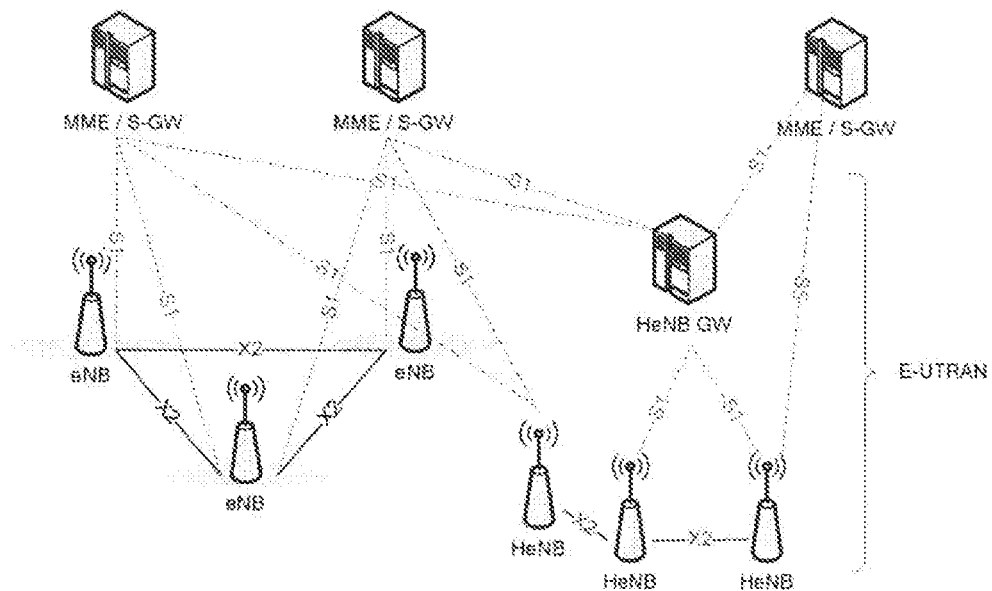
FIG. 2 is a diagram of a Femto system framework of an LTE mode in the related art.
Figure 5:
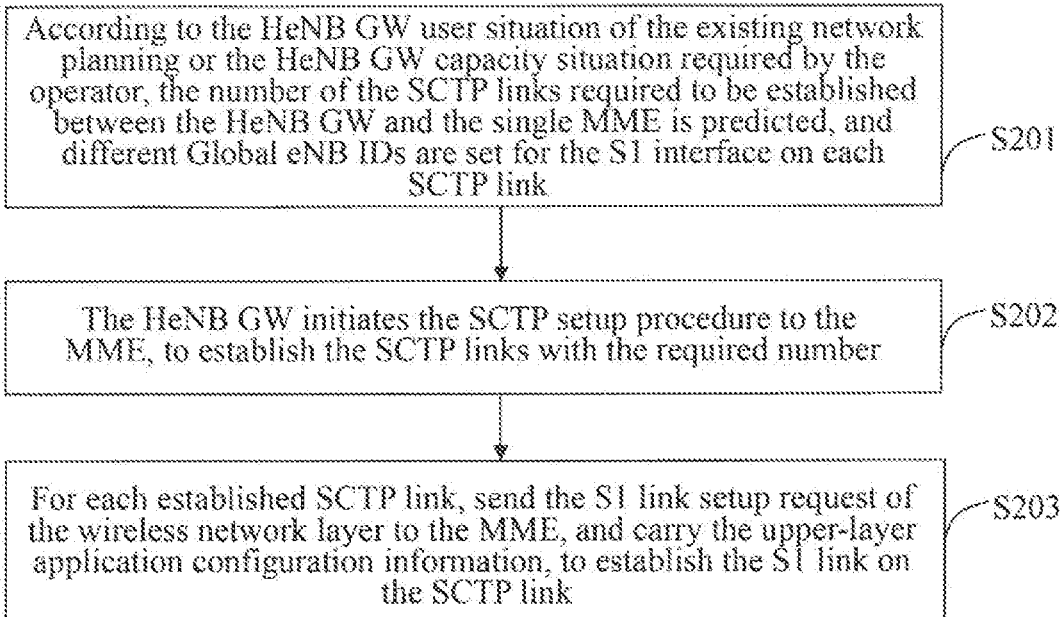
FIG. 5 is a processing flow chart according to the first embodiment of the present invention.

FIG. 5 shows a flow chart of the first embodiment of the present invention, the number of the SCTP links required to be established is estimated in advance according to the static configuration, and the SCTP links of that number are established between the HeNB GW and the single MME according to the procedures.

In S201, according to the HeNB GW user situation of the existing network planning or the HeNB GW capacity situation required by the operator, the HeNB GW predicts the number of the SCTP links required to be established between the HeNB GW and the single MME, and sets different Global eNB IDs for the S1 interfaces on each SCTP link.

When the number of the required SCTP links is being determined, it can be calculated indirectly according to the number of the required S1 links, that is, the more the number of the TAC, the CSG and the PLMN required to be supported in the cell, the more the number of the S1 links (according to the protocol, one S1 connection carries 256 TACs, 256 CSGs, 6 PLMNs at most), and then the number of the required SCTP links must be more.

In S202, the HeNB GW initiates the SCTP establishment procedure to the MME, to establish multiple SCTP links.

In S203, for each established SCTP link, the HeNB GW sends the S1 setup request to the MME, and carries the upper-layer application configuration information, to notify the upper-layer application configuration information borne by the SCTP link to the MME, where the upper-layer application configuration information specifically includes the corresponding Global eNB ID, the tracing area code, the public land mobile network identifier, the closed subscriber group identifier, the default paging discontinuous reception, the eNB name, etc. Because of this, one S1 link is established on each SCTP link respectively, and the MME sends the S1 configuration information of the MME in the S1 setup response message to the HeNB GW.

Wherein, the specific scheme of establishing the S1 link on the SCTP is that, if the MME allows to establish the S1, then the present network element establishes the corresponding S1, sends the S1 setup response and returns the S1 setup response message to the HeNB GW, wherein, the S1 setup response message carries the S1 configuration information of the MME, such as, the MME name, the public land mobile network identifier, the MME group identifier, the MME code word, the relevant MME capacity, etc.; if the MME does not allow to establish the S1 (for example, when the core network does not support the HeNB GW configuration), then the establishment is failed, the S1 setup failure message is returned to the HeNB GW.

Same operation is performed to each MME in the system according to the method of the present embodiment, and multiple SCTP links are established respectively between the HeNB GW and each MME for sharing the data transmission of the system.

Figure 6:
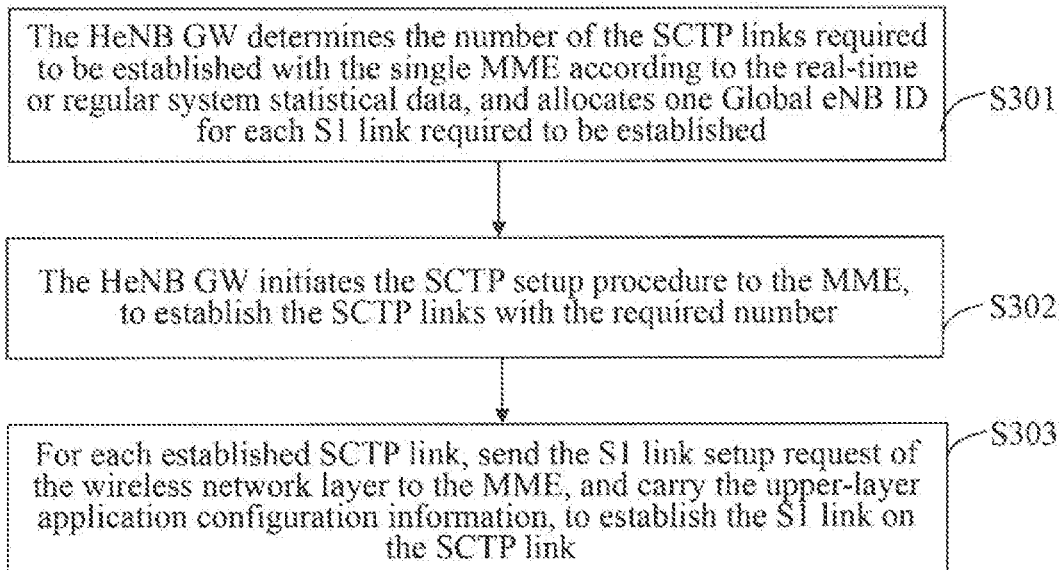
FIG. 6 is a processing flow chart according to the second embodiment of the present invention.

The above-mentioned HeNB GW determines the number of the SCTP links required to be established according to the existing network planning, etc., which is a static configuration, and it also can determine the number of the SCTP links required to be established through the dynamic method. FIG. 6 shows the flow chart of a second embodiment of the present invention, which determines the number of the SCTP links required to be established dynamically according to the real-time or regular statistical data.

In S301, the HeNB GW determines the number of the SCTP links required to be established with the single MME according to the real-time or regular system statistical data, and allocates one Global eNB ID for each S1 link required to be established.

Wherein, the statistical data can be the HeNB number, the number of the users, the signaling flow rate or the packet loss rate, etc. in real time or in the statistical period; the more the statistical data required to be processed are, the more the SCTPs that should be established are, and the more the S1 links are; for example, if it is found that the TAC number under one single MME after the statistics update at this time is surplus 256*N, then the number of the S1 links decided at this time is N+1. The advantage of doing it in this way is that, if the Femto base station is added in the system, the number of the SCTP links can be adjusted dynamically in time, to achieve the reasonable number automatically.

As to one statistical data result, the subsequent processing procedures S302-S303 are the same as the S202-S203 in the first embodiment.

After obtaining the statistical data result again, the HeNB GW determines the number of the SCTP links required currently according to the updated statistical data, and realizes forming the required number of SCTP links between the HeNB GW and each MME through deleting or increasing the SCTP links with each MME on the basis of last configuration, to satisfy the system resource requirement to the greatest extent under the reasonable precondition.

In order to transmit the S1 interface message between the HeNB and the MME, multiple SCTP links are established between the HeNB GW and each MME according to the above-mentioned scheme; then after establishing the S1 link, one S1 link is further required to be established between the HeNB and the HeNB GW, and the specific method is that: the HeNB sends out the S1 setup request to the HeNB GW, after the HeNB GW receives the request, one SCTP link is selected in multiple SCTP links between each MME, which meet a requirement (that is, when the MME supports all or some PLMNs in the S1 setup request message of the HeNB), and the HeNB GW for the HeNB to reside; and then the S1 link establishment response is replied to the HeNB after the residence is successful; and if the residence is failed, then the S1 setup failure message is replied; if there are multiple MMEs satisfying the requirement, there may be finally multiple SCTP links for the HeNB to reside for transmitting the S1 message of the HeNB.

Wherein, when selecting one SCTP link from multiple SCTP links to perform the HeNB residence, it should be considered according to the principle of loading balance, and preferably selects the SCTP link to which the minimum wireless access points (APs) are connected to at present to reside (or the SCTP with the minimum flow rate to reside). After the residence is successful, then one S1 link is established between the HeNB and the HeNB GW according to the S1 setup request sent out by the HeNB and the carried upper-layer application configuration information in the request. After the HeNB GW receives the paging message of the MME, it can find the HeNB which meets the paging requirement to page according to the SCTP link of the paging message, rather than to find the HeNB which meets the paging requirement to page under the whole HeNB GW, which can prevent repeatedly sending the same paging message issued by the MME in other SCTPs to the same one AP.

Figure 7:
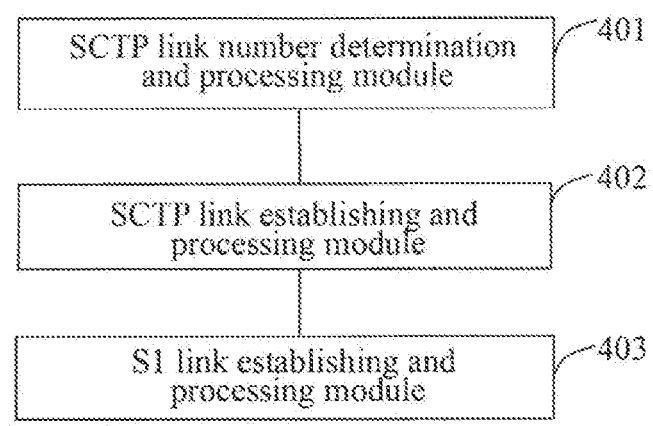
FIG. 7 is a diagram of an apparatus for increasing gateway stability of the present invention.

Further, in order to improve the gateway stability of the Femtocell system of the LTE mode, the present invention further provides an apparatus for increasing gateway stability in a long term evolution system (LTE) mode Femtocell system, as shown in FIG. 7, the apparatus including: a SCTP link number determination and processing module 401, configured to: make a gateway (HeNB GW) determine that multiple SCTP links need to be established between the HeNB GW and a single mobility management entity (MME), and set different Global eNB identifiers (Global eNB IDs) for S1 interfaces on different SCTP links under the same one MME; an SCTP link establishing and processing module 402, configured to: make the HeNB GW establish multiple SCTP links between the HeNB GW and the MME; and an S1 link establishing and processing module 403, configured to: make the HeNB GW, for each established SCTP link, notify upper-layer application configuration information borne by the SCTP link to the MME through an S1 setup request, and establish an S1 link on the SCTP link.

Wherein, the SCTP link number determination and processing module 401 can determine the number of the SCTP links required to be established according to an existing network planning, or according to real-time or regular system statistical data. Wherein, when the number of the SCTP links required to be established is determined according to the real-time or regular system statistical data, after the SCTP link number determination and processing module determines the number of SCTP links required to be established currently according to the system statistical data at this time, form the number of the SCTP links required currently through deleting or adding an SCTP link between the HeNB GW and the MME established last time.

In addition, the apparatus for increasing gateway stability in the LTE mode Femtocell system further includes: an SCTP link selection and processing module, configured to: when a Fetmo base station HeNB of an LTE mode sends out an S1 setup request to the HeNB GW and after the HeNB GW receives the request, select one SCTP link in multiple SCTP links between the MME which meet a requirement and the HeNB GW for the HeNB to reside, and then establish an S1 link between the HeNB and the HeNB GW according to the S1 setup request sent out by the HeNB and the upper-layer application configuration information carried therein. If there are multiple MMEs satisfying the requirement, there may be finally multiple SCTP links for the HeNB to reside for transmitting the S1 message of the HeNB.

By using the above-mentioned apparatus of the present invention into the Femtocell system of the LTE mode, it can realize establishing multiple SCTP links between the network gateway HeNB GW and the single MME, to achieve the objective of improving the HeNB GW stability.

Although for the example objective, the preferable embodiment of the present invention is already disclosed, the skilled in the art will realize that various kinds of improvement, increase and displacement are possible, therefore, the above embodiment is not intended to limit the scope of the present invention.

INDUSTRIAL APPLICABILITY

The beneficial results of embodiment of the present invention are as follows:

1, a method to establish multiple SCTP links between the HeNB GW and the single MME is provided, which breaks the restrictions brought by one SCTP link between the HeNB GW and the MME and can improve the capacity and the stability of the HeNB GW on the basis of the used protocol;

2, the number of the required SCTP links is determined based on the existing network planning, or, the real-time or regular system statistical data, which not only can meet the using requirement of the existing network, but also is unlikely to waste the system resources to establish the idle link;

3, when the S1 link is established between the HeNB and the HeNB GW, the SCTP link of which a current flow rate is minimum or to which minimum access points (AP) are connected is selected preferably for the HeNB to reside, which can balance the system loading, guarantee the smooth transmission of the S1 interface message and improve the system stability.

I claim:

1. A method for increasing Home eNB Gateway (HeNB GW) stability in a long term evolution (LTE) system mode Femtocell system, comprising:
a HeNB GW determining that multiple stream control transmission protocol (SCTP) links need to be established between the HeNB GW and a single mobility management entity (MME), and setting different Global eNB identifiers (Global eNB IDs) for S1 interfaces on different SCTP links under one same MME;
the HeNB GW establishing multiple SCTP links between the HeNB GW and the MME; and
for each established SCTP link, the HeNB GW notifying the MME of upper-layer application configuration information borne by the SCTP link through an S1 setup request, and establishing an S1 link on the SCTP link.

2. The method for increasing HeNB GW stability according to claim 1, wherein, the HeNB GW determines the number of the SCTP links required to be established according to an existing network planning, or, determines the number of the SCTP links required to be established according to real-time or regular system statistical data.

3. The method for increasing HeNB GW stability according to claim 2, wherein, when the number of the SCTP links required to be established is determined according to the real-time or regular system statistical data, after determining the number of SCTP links required to be established currently according to the statistical data of the system at this time, the number of the SCTP links required currently is formed through deleting or adding an SCTP link between the HeNB GW and the MME.

4. The method for increasing HeNB GW stability according to claim 1, after establishing an S1 link on the SCTP link, further comprising:
a Femto base station HeNB of an LTE mode sending out an S1 setup request to the HeNB GW, after the HeNB GW receives the request, the HeNB GW selecting one SCTP link in multiple SCTP links between the MME, which meet a requirement, and the HeNB GW for the HeNB to reside, and then establishing one S1 link between the HeNB and the HeNB GW according to the S1 setup request sent out by the HeNB and upper-layer application configuration information carried therein.

5. The method for increasing HeNB GW stability according to claim 4, wherein, selecting one SCTP link to reside refers to selecting an SCTP link, of which a current flow rate is minimum or to which minimum HeNBs are connected, to reside.

6. An apparatus for increasing Home eNB Gateway (HeNB GW) stability in a long term evolution (LTE) system mode Femtocell system, comprising:
a stream control transmission protocol (SCTP) link number determination and processing module, configured to: make a HeNB GW determine that multiple SCTP links need to be established between the HeNB GW and a single mobility management entity (MME), and set different Global eNB identifiers (Global eNB IDs) for S1 interfaces on different SCTP links under one same MME;
an SCTP link establishing and processing module, configured to: make the HeNB GW establish multiple SCTP links between the HeNB GW and the MME; and
an S1 link establishing and processing module, configured to: make the HeNB GW, for each established SCTP link, notify the MME of upper-layer application configuration information borne by the SCTP link through an S1 setup request, and establish an S1 link on the SCTP link.

7. The apparatus for increasing HeNB GW stability according to claim 6, wherein, the SCTP link number determination and processing module is configured to: determine the number of the SCTP links required to be established according to an existing network planning, or, determine the number of the SCTP links required to be established according to real-time or regular system statistical data.

8. The apparatus for increasing HeNB GW stability according to claim 7, wherein, the SCTP link number determination and processing module is configured to: when the number of the SCTP links required to be established is determined according to the real-time or regular system statistical data, after determining the number of SCTP links required to be established currently according to the statistical data of the system at this time, form the number of the SCTP links required currently through deleting or adding an SCTP link between the HeNB GW and the MME.

9. The apparatus for increasing HeNB GW stability according to claim 6, further comprising:
   an SCTP link selection and processing module, configured to: when a Femto base station HeNB of an LTE mode sends out an S1 setup request to the HeNB GW, select one SCTP link in SCTP links between the MME, which meet a requirement, and the HeNB GW for the HeNB to reside after the HeNB GW receives the request, and then establish one S1 link between the HeNB and the HeNB GW according to the S1 setup request sent out by the HeNB and upper-layer application configuration information carried therein.

10. The apparatus for increasing HeNB GW stability according to claim 9, wherein, the SCTP link selection and processing module selecting one SCTP link to reside refers to selecting an SCTP link, of which a current flow rate is minimum or to which minimum HeNBs are connected, to reside.

11. The method for increasing HeNB GW stability according to claim 2, after establishing an S1 link on the SCTP link, further comprising:
   a Femto base station HeNB of an LTE mode sending out an S1 setup request to the HeNB GW, after the HeNB GW receives the request, the HeNB GW selecting one SCTP link in multiple SCTP links between the MME, which meet a requirement and the HeNB GW for the HeNB to reside in, and then establishing one S1 link between the HeNB and the HeNB GW according to the S1 setup request sent out by the HeNB and upper-layer application configuration information carried therein.

12. The method for increasing HeNB GW stability according to claim 11, wherein, selecting one SCTP link to reside refers to selecting an SCTP link, of which a current flow rate is minimum or to which minimum HeNBs are connected, to reside.

13. The method for increasing HeNB GW stability according to claim 3, after establishing an S1 link on the SCTP link, further comprising:
   a Femto base station HeNB of an LTE mode sending out an S1 setup request to the HeNB GW, after the HeNB GW receives the request, the HeNB GW selecting one SCTP link in multiple SCTP links between the MME, which meet a requirement, and the HeNB GW for the HeNB to reside in, and then establishing one S1 link between the HeNB and the HeNB GW according to the S1 setup request sent out by the HeNB and upper-layer application configuration information carried therein.

14. The method for increasing HeNB GW stability according to claim 13, wherein, selecting one SCTP link to reside refers to selecting an SCTP link, of which a current flow rate is minimum or to which minimum HeNBs are connected, to reside.

15. The apparatus for increasing HeNB GW stability according to claim 7, further comprising:
   SCTP link selection and processing module, configured to: when a Femto base station HeNB of an LTE mode sends out an S1 setup request to the HeNB GW, select one SCTP link in multiple SCTP links between the MME, which meet a requirement, and the HeNB GW for the HeNB to reside in after the HeNB GW receives the request, and then establish one S1 link between the HeNB and the HeNB GW according to the S1 setup request sent out by the HeNB and upper-layer application configuration information carried therein.

16. The apparatus for increasing HeNB GW stability according to claim 15, wherein, the SCTP link selection and processing module selecting one SCTP link to reside refers to selecting an SCTP link, of which a current flow rate is minimum or to which minimum HeNBs are connected, to reside.

17. The apparatus for increasing HeNB GW stability according to claim 8, further comprising:
   an SCTP link selection and processing module, configured to: when a Femto base station HeNB of an LTE mode sends out an S1 setup request to the HeNB GW, select one SCTP link in multiple SCTP links between the MME, which meet a requirement, and the HeNB GW for the HeNB to reside in after the HeNB GW receives the request, and then establish one S1 link between the HeNB and the HeNB GW according to the S1 setup request sent out by the HeNB and upper-layer application configuration information carried therein.

18. The apparatus for increasing HeNB GW stability according to claim 17, wherein, the SCTP link selection and processing module selecting one SCTP link to reside refers to selecting an SCTP link, of which a current flow rate is minimum or to which minimum HeNBs are connected, to reside.

* * * * *